UNITED STATES PATENT OFFICE.

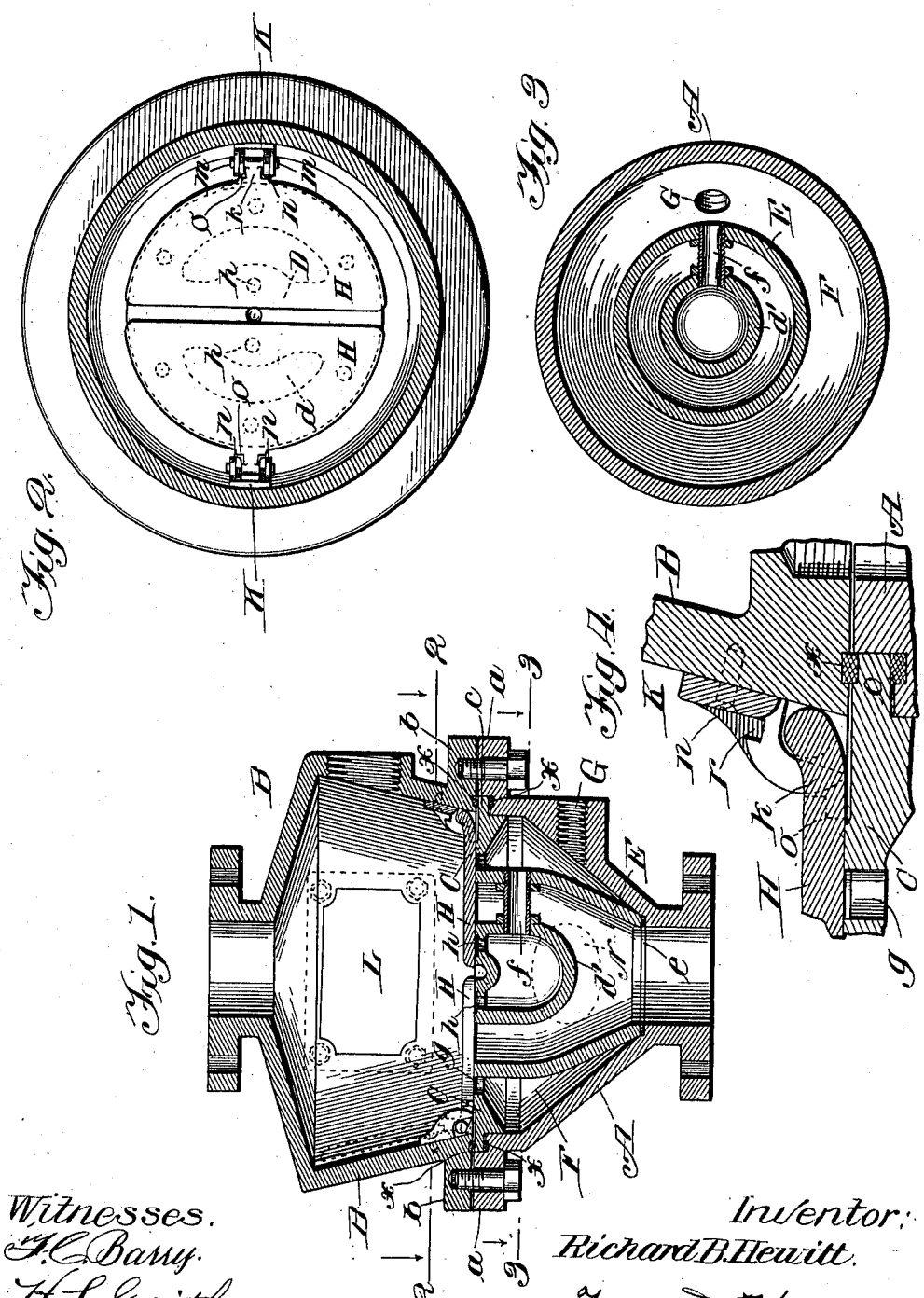

RICHARD B. HEWITT, OF CHICAGO, ILLINOIS, ASSIGNOR TO GENERAL FIRE EXTINGUISHER COMPANY, OF NEW YORK, N. Y., A CORPORATION OF NEW YORK.

VALVE FOR CONTROLLING THE WATER-INLET OF AUTOMATIC SPRINKLER SYSTEMS.

982,719. Specification of Letters Patent. Patented Jan. 24, 1911.

Application filed January 5, 1903, Serial No. 137,936. Renewed October 29, 1906. Serial No. 341,163.

*To all whom it may concern:*

Be it known that I, RICHARD B. HEWITT, a citizen of the United States, and a resident of Chicago, in the county of Cook and State of Illinois, have invented certain new and useful Improvements in Valves for Controlling the Water-Inlet of Automatic Sprinkler Systems, of which the following is a full, clear, and exact specification.

My invention relates to valves which automatically open and permit the water to enter the pipes of a sprinkler system, the moment the sprinklers open and permit the escape of the compressed air with which said system is charged, and its object is to avoid the use of any mechanical agency for keeping the closures of said valve open after the water has once entered the sprinkler system therethrough; to enable access to be had to its interior to replace said closures on their seats; to facilitate the separation of sections of its shell or case to repair or substitute packing or parts in its interior, and to provide for the instant creation of a column of water when it opens to promptly operate an alarm and thus notify the occupants of the building. This I accomplish by the means hereinafter fully described and as particularly pointed out in the claims.

In the drawings, Figure 1 is a vertical central section of my invention. Fig. 2 is a transverse section thereof taken on dotted lines 2—2, Fig. 1, looking in the direction indicated by the arrows. Fig. 3 is a transverse section taken on dotted line 3—3, Fig. 1, looking in the direction indicated by the arrows. Fig. 4 is a vertical section of a broken away portion of said valve drawn to a larger scale, showing the hinge of one of the closures thereof.

Referring to the drawings, A represents the lower inverted truncated cone-shaped portion of the case or shell of the valve, having both its upper and lower part cylindrical, and its upper portion provided with an outwardly projecting circumferential flange *a*. The lower edges of the upper portion B of the shell is likewise provided with a circumferential flange *b*, which corresponds in dimensions and is secured to flanges *a* by means of suitable screws or bolts.

The inner edges of the upper end of the lower section A of the case is rabbited to provide a seat for the circumferential flange *c* of the edge of the valve-seat C. This valve-seat comprises a circular plate the circumferential edges of which fit snugly in the mouth of the upper end of section A, with the flange *c* sandwiched between the packing rings *x*, *x*, and clamped between the upper and lower section so as to make a perfectly water-tight joint. The center of this valve-seat is provided with a large central opening *d*, which is spanned by a diametrical bridge D, that has a hollow circular basin *d'* depending from its center of length concentric with said section A. Depending from the annular edges of this opening *d* is a circular inverted bell-shaped cage E, the circular edge of whose lower end rests upon a packing ring *e*, seated in the rabbited upper edge of the opening in the lower contracted end of section A.

When the valve-seat C is in its proper position, a water-tight annular chamber F is formed between said cage and the sides of the lower section A, of the shell, with which the basin *d* communicates by means of the radially extending nipple *f*. There are holes *g*, *g*, and *h*, *h*, in the valve-seat through which, when there is any leakage under the valves the water will pass off into basin *d* and chamber F. This chamber is normally empty but any leakage accumulating therein is permitted to escape therefrom out through the drain opening G, to an automatic drip-valve, which is normally open, but will close when the valve opens and the full pressure of the water enters said chamber, and thereby direct the water to a suitable alarm mechanism, which it causes to operate. The drip-valve and the alarm mechanism referred to is not shown herein, as they are well known attachments to the kind of a valve to which my improvements relate, and I do not claim anything new in connection therewith.

The valve-closure of my invention consists of two substantially semi-circular flat plates H, H, which are hinged at or near the base of the inner surface of the side walls of the upper section, in suitable hinge-plates K, K, located diametrically opposite each other, and intersected by a transaxial plane drawn at right angles to the direction of length of bridge D. The adjacent opposing edges of these valve-plates are parallel, and in their normal positions rest lengthwise upon the bridge D, and when in this position close the central opening d in the valve-seat and the holes g therethrough constituting the means by which chamber F communicates with the chamber above the valve-seat.

The chamber I above the valve-seat has its circumferential walls inclined outward and is of such a height that the valve-plates can be swung upward within it and recline back against the side walls thereof. In order to prevent these valve-plates from accidentally falling back upon the valve-seat I have constructed the hinge thereof in such manner that the said plates, when they reach the limit of their upward movement, automatically gravitate into a seat in and are locked by said hinge-plates. This I accomplish by providing a valve-plate with T-shaped arms k, k, which project from the edge of said plates in the same plane as the tops thereof but preferably curve upward slightly toward their ends. The alining branches of these arms form the pintles m, m, of the hinge and these pintles are journaled in the vertically elongated bearings of the corresponding parallel knuckles n, n, projecting from the hinge-plate K and thus permit the valve-plates to move with the valve-seat according to the thermal contraction and expansion of the latter, without affecting their ability to keep the valve-seat effectually closed. When the plates are moved upward the shoulders o at the root of these arms k bear against and ride upon the curved edge of said knuckles n until the plate reaches the limit of its upward movement, whereupon its edges, by reason of the weight of said plate, drops into a recessed seat r at the upper end of said curved edge of the knuckle, and thereby becomes locked so that it cannot of its own volition fall back into the horizontal position.

The upper section is provided with a lateral outlet M through which the water is drained from the pipes of the sprinkler system immediately the water is turned off therefrom, and said section is also covered by a covered hand-hole L in its side walls whereby access can be had to its interior. The lower section, below the plane of the valve-seat is likewise provided with a hand-hole N, through which access can be had to ascertain if the valve is tight, even after the sprinkler system is charged with compressed air.

My improved valve is preferably secured at its lower end to a water-supply pipe, and at its upper end to the pipes of an automatic sprinkler system, and in operation the pipes of the sprinkler system are pumped full of compressed air. This air pressure keeps the valve-plates H, H, tightly down upon the valve-seat C, and closes the water-way through the said valve, and it is only when the sprinklers in said system open and permit the escape of this compressed air that the water pressure, which fills the cage below said valve-plates rises, and causes the same to become automatically locked in their open position, and enters the pipes of the sprinkler system.

It will be observed that the closure of the valve-seat by the valve-plates is, substantially, in a single plane, thereby avoiding the increased danger of leakage where the valve has more than one seat, and attention has already been called to the fact that the valve-plates have a limited play to accommodate the movement of the parts comprising the valve-seat due to changes of temperature. This construction absolutely avoids the "compensating" feature which in some way or another it has been necessary to introduce in valves of this class in order to avoid the variations in the distances between, or in other words, the separation of contacting parts of valves, constructed of different materials, such as cast iron and brass, when contracting and expanding.

As one of the principal functions of the basin is to reduce the superficial area of the underside of the valve plates which is exposed to the water, the basin d may not be connected by the nipple f to chamber F, and may be greatly modified in construction.

If desired the upper surface of the valve-seat may be provided with concentric channels o and p by means of which any seepage under said valve plates, may be conveyed and directed to the holes g and h through which as stated it drains into chamber F.

What I claim as new and desire to secure by Letters Patent is:—

1. An automatic differential valve interposed between the supply and distribution pipes of a fire extinguishing system comprising a suitable case, a water-way extending centrally through the lower portion of said case, and a valve closure comprising two valve-plates hinged to the sides of said case and normally closing said water-way.

2. An automatic differential valve interposed between the supply and distribution pipes of a fire extinguishing system comprising a suitable case, a water-way extending centrally through the lower portion of said case, and a valve closure comprising two corresponding valve-plates hinged to the sides of said case diametrically opposite each other and normally closing said water-way.

3. An automatic differential valve interposed between the supply and distribution pipes of a fire extinguishing system comprising a suitable case, a water-way extending centrally through the lower portion of said case, a normally empty chamber surrounding said water-way, and a valve closure comprising two valve-plates hinged to the sides of said case and normally closing said water-way.

4. An automatic differential valve interposed between the supply and distribution pipes of a fire extinguishing system comprising a suitable case, a water-way extending centrally through the lower portion of said case, a normally empty chamber surrounding said water-way, and a valve closure comprising two corresponding valve-plates hinged to the sides of said case diametrically opposite each other and normally closing said water-way.

5. An automatic differential valve interposed between the supply and distribution pipes of a fire extinguishing system, a suitable case, a water-way extending centrally through the lower part of said case, a normally empty basin located within said water-way, a normally empty chamber surrounding said water-way, with which said basin communicates, and a hinged double flap valve within said case normally closing said water-way and automatically locking when opened.

6. An automatic differential valve interposed between the supply and distribution pipes of a fire extinguishing system, a suitable case, a water-way extending centrally through the lower part of said case, a normally empty basin located within said water-way, a normally empty chamber surrounding said water-way, with which said basin communicates, and a valve closure comprising two valve-plates hinged to the sides of the case and normally closing said water-way.

7. An automatic differential valve interposed between the supply and distribution pipes of a fire extinguishing system comprising a suitable case, a valve-seat, and hinged valves the knuckles of the hinge-plate of which is constructed with recesses into which the edge of said valves gravitate when at the limit of their upward movement.

8. An automatic differential valve comprising a suitable case, a water-way extending through said case, and a valve-closure comprising two hinged valve-plates normally closing said water-way, each of said valve plates having a hinged construction adapted to automatically lock said valve-plate in its open position.

9. An automatic differential valve comprising a suitable case, a water-way extending through said case, a valve-closure comprising two valve-plates, a bridge-piece extending across said water-way, a hollow basin centrally supported by said bridge-piece, valve-seats on said bridge-piece, and openings between said valve-seats leading into said hollow basin.

10. An automatic differential valve comprising a suitable case, a water-way extending through said case, differential valve-seats arranged in substantially the same plane, and a valve connected to the case but free to move with said valve-seats under any unequal expansion or contraction of the parts without opening the valve.

11. An automatic differential valve comprising a suitable case, a water-way extending through said case, differential valve-seats arranged in substantially the same plane and formed of a different metal from that of the case, and a valve connected to the case but free to move with said valve-seats under any unequal expansion or contraction of the parts without opening the valve.

12. An automatic differential valve comprising a suitable case, a water-way extending through said case, differential valve-seats arranged in substantially the same plane, and a valve-closure comprising two valve-plates connected to the case but free to move with said valve-seats under any unequal expansion or contraction of the parts without opening the valve.

13. An automatic differential valve comprising a suitable case, a water-way extending through said case, differential valve-seats arranged in substantially the same plane, and a valve-closure comprising two valve-plates hinged to the case but free to move with said valve-seats under any unequal expansion or contraction of the parts without opening the valve.

In testimony whereof I have hereunto set my hand.

RICHARD B. HEWITT.

Witnesses:
Wm. K. Otis,
Frank D. Thomason.